(12) United States Patent
Freidinger

(10) Patent No.: US 10,173,154 B2
(45) Date of Patent: Jan. 8, 2019

(54) FILTER DEVICE FOR FLUIDS

(71) Applicant: Hydac Filtertechnik GmbH, Sulzbach/Saar (DE)

(72) Inventor: Martin Freidinger, Saarbrücken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 154 days.

(21) Appl. No.: 14/401,856

(22) PCT Filed: May 15, 2013

(86) PCT No.: PCT/EP2013/001439
§ 371 (c)(1),
(2) Date: Nov. 18, 2014

(87) PCT Pub. No.: WO2013/178326
PCT Pub. Date: Dec. 5, 2013

(65) Prior Publication Data
US 2015/0136682 A1    May 21, 2015

(30) Foreign Application Priority Data
Jun. 1, 2012  (DE) .................. 10 2012 010 895

(51) Int. Cl.
*B01D 29/52* (2006.01)
*B01D 35/147* (2006.01)
*B01D 35/153* (2006.01)
*B01D 29/23* (2006.01)
*B01D 35/12* (2006.01)
(Continued)

(52) U.S. Cl.
CPC ........ *B01D 35/1573* (2013.01); *B01D 29/114* (2013.01); *B01D 29/52* (2013.01); *B01D 35/12* (2013.01); *B01D 29/23* (2013.01); *B01D 35/147* (2013.01); *B01D 35/153* (2013.01)

(58) Field of Classification Search
None
See application file for complete search history.

(56) References Cited

U.S. PATENT DOCUMENTS 4,606,820 A * 8/1986 Rea .................. B01D 35/12
                                                137/625.47
5,443,722 A * 8/1995 Desai .................. B01D 29/35
                                                137/625.21
(Continued)

FOREIGN PATENT DOCUMENTS

DE  2011 004 367 A1   8/2012
GB        494437 A *  10/1938 .......... B01D 35/12
GB       1164628 A *   9/1969 .......... B01D 35/12

*Primary Examiner* — Bobby Ramdhanie
*Assistant Examiner* — Jonathan M Peo
(74) *Attorney, Agent, or Firm* — Wenderoth, Lind & Ponack, L.L.P.

(57) ABSTRACT

A filter device for fluids has a connection member (1) with a fluid input (19) for unfiltrate and fluid output (13) for filtrate, a first (43) and second filter elements (3) and a switching device (29) located in the connection member (1). By the switching device, a fluid connection between the fluid input (19) and fluid output (13) can be selectively established via the first filter element (43) or the second filter element (3). One of the filter elements is integrated into the interior of the connection member (1) as an auxiliary filter (43).

20 Claims, 3 Drawing Sheets

Fig.1

(51) Int. Cl.
*B01D 35/157* (2006.01)
*B01D 29/11* (2006.01)

(56) References Cited

U.S. PATENT DOCUMENTS

| | | | | |
|---|---|---|---|---|
| 6,197,195 B1* | 3/2001 | Booth | ................... | B01D 29/35 137/454.6 |
| 2011/0073550 A1* | 3/2011 | Cartarius | .............. | B01D 29/15 210/798 |

* cited by examiner

FILTER DEVICE FOR FLUIDS

FIELD OF THE INVENTION

The invention relates to a filter device for fluids, having a connection member with a fluid input for unfiltrate and fluid output for filtrate, having first and second filter elements and having a switching device located in the connection member. By the switching device, a fluid connection between the fluid input and fluid output can be selectively established via the first or second filter element.

BACKGROUND OF THE INVENTION

Filter devices of this type are prior art. As "double filters", such filter devices are used, inter alia, in transmissions, such as stationary transmissions or ship transmissions, as oil filters. In such installations, which are to be operable without operational interruptions, these filter devices enable the replacement of a used filter element to be performed without shutting down the affected facility or doing without a filter function during the maintenance measures.

SUMMARY OF THE INVENTION

The invention has an object of providing a filter device of the type described above, which is distinguished by simple operability and a particularly compact construction.

This object is basically achieved according to the invention by a filter device having a filter element of the filter device integrated in the interior of a connection member as an auxiliary filter. While in the prior art, two filter elements are provided on the exterior of the connection member, which are each designed and dimensioned for a filter performance corresponding to the full operating duration of the respective filter element, in the device according to the invention, only one correspondingly large-dimensioned filter removably attached on the exterior of the connection housing is necessary. The filter device is further operable via the inner auxiliary filter during the replacement process of this outer filter. Since the further operation via the auxiliary filter, which is referred to here as the first filter element, only occurs during the short phases of the replacement process of the removable filter, which is referred to here as the second filter element, a small-dimensioned auxiliary filter, which is easily integratable in the design of the connection member, is usable as an auxiliary filter.

As in the prior art, the second filter element, as the main filter, can be removably attached to the exterior of the connection member and can be implemented in the form of a spin-on cartridge, for example.

In particularly advantageous exemplary embodiments, the switching device has a ball valve.

In a particularly advantageous manner, the auxiliary filter and ball valve can be unified in the connection member to form one assembly, which enables a particularly compact construction of the connection member.

In particularly advantageous embodiments, the assembly is configured so that auxiliary filter and ball valve have a functional element shared thereby or functional elements pressing directly against one another, so that ball valve and auxiliary filter practically form a module.

In this case, the arrangement can advantageously be made so that a spacer member, which holds the switching ball of the ball valve in position in the ball valve housing, has an input opening, as a shared functional element of auxiliary body and ball valve, which forms a fluid path between them and the inner filter cavity of the auxiliary filter.

In particularly advantageous exemplary embodiments, the ball valve housing is extended beyond the switching ball along an axis extending through the filter cavity of the auxiliary filter. An output channel, extending perpendicularly to the main axis and leading to the fluid output, branches off thereon from the ball valve housing. The auxiliary filter is thus practically directly installed in the output channel. The auxiliary filter arranged on the branching point of the output channel in the ball valve housing then has a direct fluid connection on the exterior of its filter medium, which encloses the inner filter cavity, to the output channel.

In a particularly advantageous manner, the ball valve housing can have, on the side opposite to the input opening of the auxiliary filter, an entry opening enclosing the main axis. The entry opening has a fluid connection to the unfiltered side of the respective main filter attached to the connection member, and can also have an inflow opening. The inflow opening is aligned on the spindle axis of the ball valve, which spindle axis is perpendicular to the main axis, and has a fluid connection to the fluid input. The inflow opening is selectively connectable, by the switching ball, to the entry opening leading to the main filter or to the input opening leading to the auxiliary filter.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
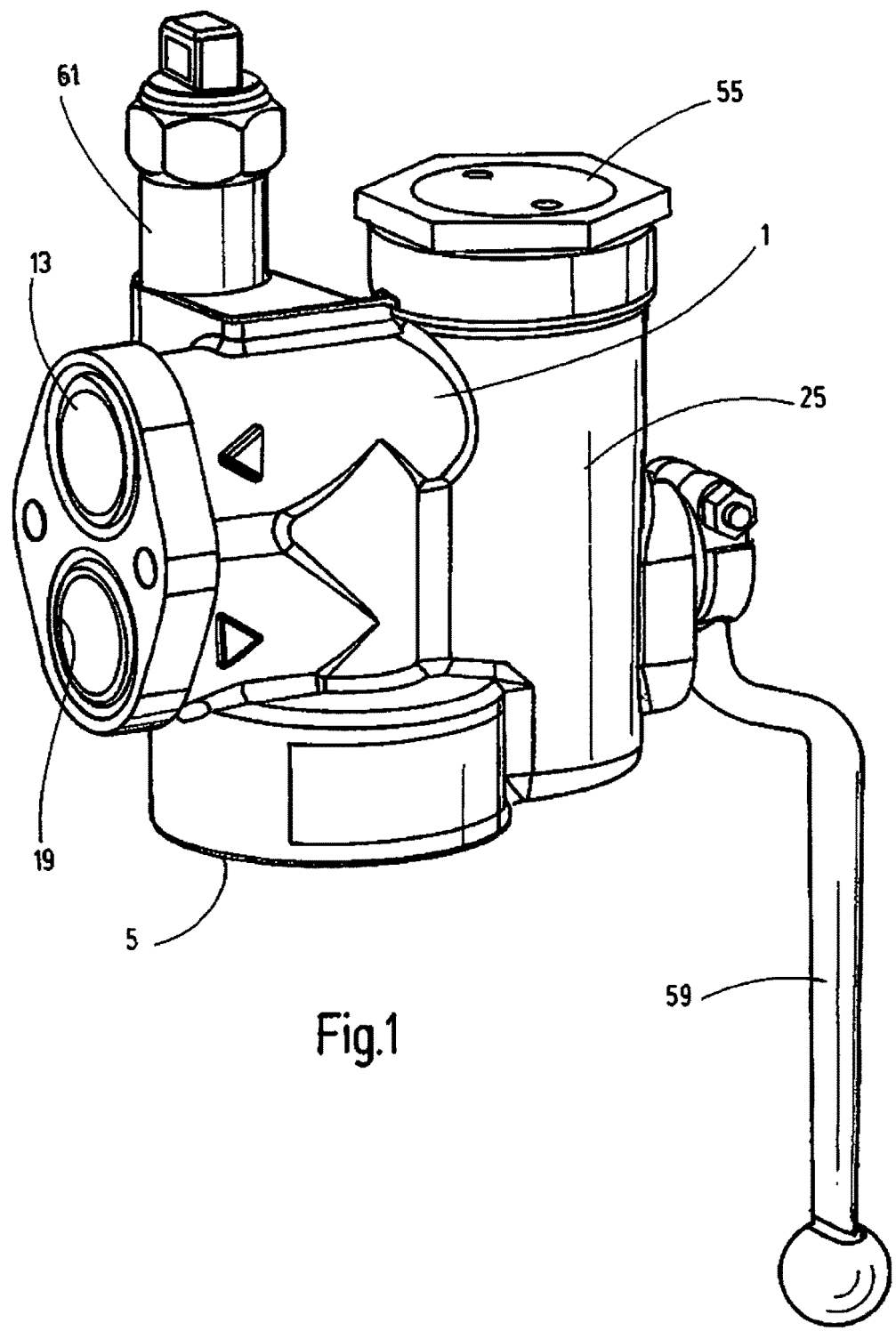
FIG. 1 is a perspective view, drawn in only a slightly smaller scale in relation to a natural embodiment, of a filter device according to an exemplary embodiment of the invention, wherein a main filter is omitted.
Figure 2:
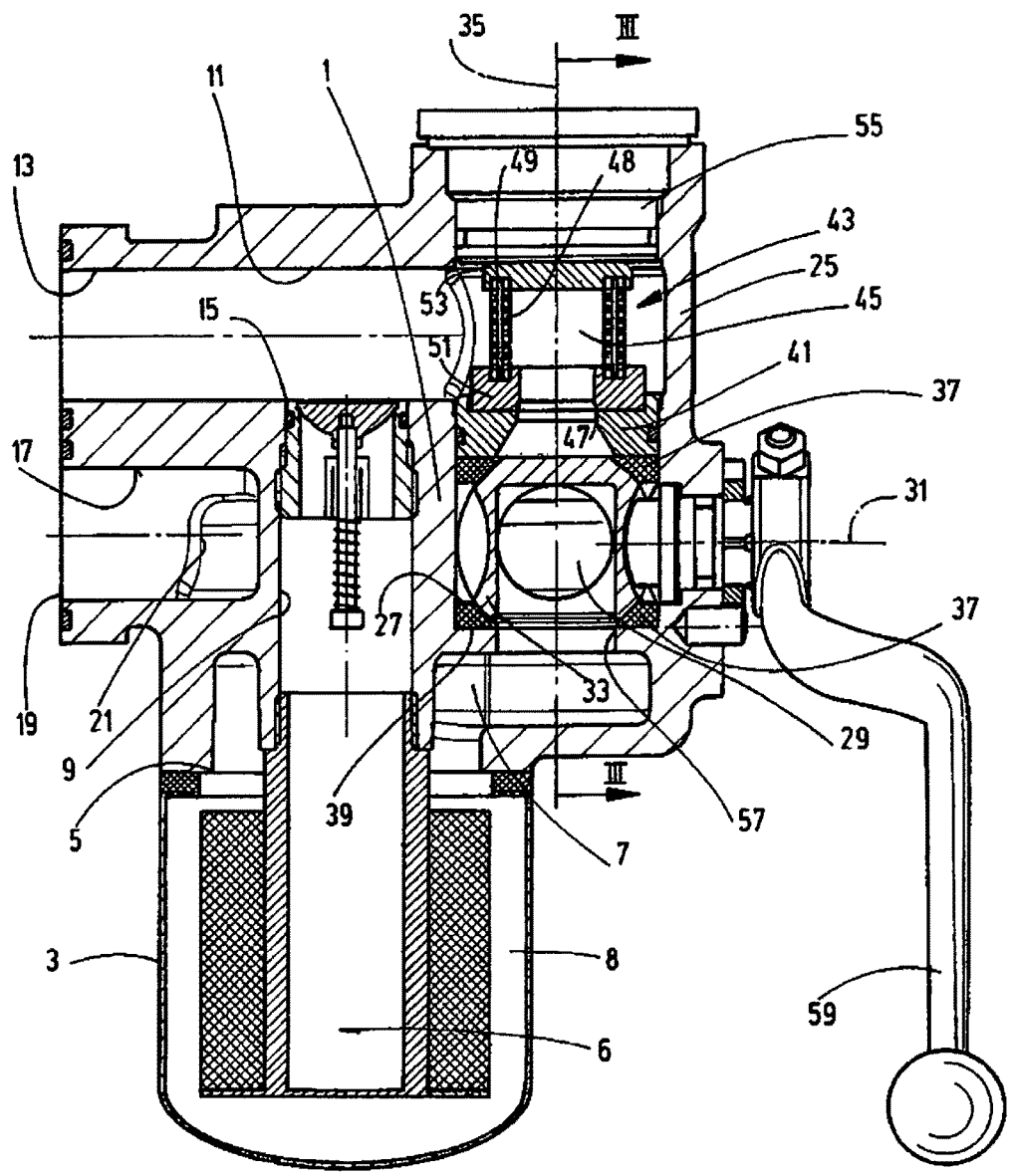
FIG. 2 is a side view in section of the exemplary embodiment in the scale of FIG. 1, wherein a main filter is shown.
Figure 3:
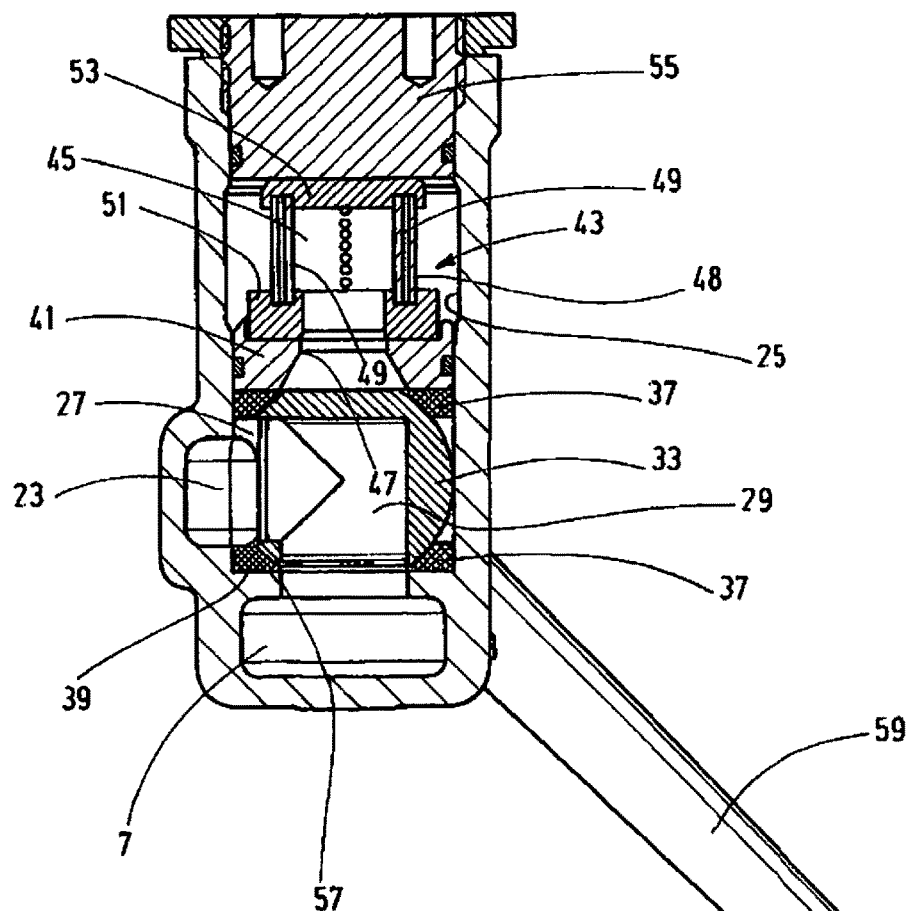
FIG. 3 is an end view in section taken along line III-III of FIG. 2.

FIG. 1 shows the exemplary embodiment to be described here of the filter device according to the invention, without a main filter attached to the connection member 1. The main filter 3 is shown in FIG. 2. The main filter 3 is a spin-on filter cartridge, which is removably connectable by a screw connection in the typical manner in the case of such filter cartridges on a filter head 5 implemented on the connection member 1. A fluid guide 7, which forms an input to the unfiltered side of the main filter 3, and a central fluid guide 9, which forms the output from the filtered side 6 of the main filter 3, are provided on the filter head 5. This fluid guide 9 is formed by a channel. The channel opens in the connection member 1. With regard to the illustration of FIG. 2, the channel in the vertical direction and ends on its top in an output channel 11 extending perpendicularly to the vertical. Output channel 11 ends at a fluid output 13 of the connection member 1. A spring-loaded check valve 15 releases the flow path when filtrate flows via the fluid guide 9 into the output channel 11 during filtration operation of the main filter 3, but closes the fluid guide 9 when the main filter 3 is removed. Check valve 15 is located at the discharge of the fluid guide 9 into the output channel 11. In the illustration of the drawing corresponding to FIG. 2, an input channel 17 extends parallel to the output channel 11 and is located below the output channel 11 in the connection member 1. This input channel 17 starts from the fluid input 19 of the connection member 1, merges into a bulge 21 continuing the fluid path around the wall of the fluid guide 9, and extends into an input chamber 23, see FIG. 3. This input chamber 23 is located on a ball valve housing 25 at an inflow opening 27 of a ball valve 29. More precisely, the inflow opening 27 is aligned with the spindle axis 31 of the rotatable switching ball 33 of the ball valve 29.

The ball valve housing 25 extends along a main axis 35, which extends vertically in FIG. 2. For its axial position along the main axis 35, the switching ball 33 is held between sealing disks 37. The lower sealing disk in the drawing presses against a housing projection 39 of the ball valve housing 25. The upper sealing disk 37 is held on a spacer member 41, which is a component of an auxiliary filter 43. More precisely, the spacer member 41 forms the element receptacle for the filter element of the auxiliary filter 43. As the unfiltered side, auxiliary filter 43 has an inner filter cavity 45. Filter cavity 45 has a fluid connection to the ball valve 29, via an input opening 47 located in the spacer member 41. Inlet opening 47 is implemented concentrically to the main axis 35 in the spacer member 41. The auxiliary filter 43 has a filter medium enclosing the filter cavity 45, which is arranged in the present exemplary embodiment between two fluid-permeable support pipes 48 and 49. Support pies 48 extend between filter end members 51 and 53, with the lower end member 51 in the drawing pressing against the spacer member 41 used as the element receptacle. In this case, the end member 51 forms the base part of the filter element, and the spacer member 41 can be one component. The entire assembly made of the ball valve 29 and auxiliary filter 43 is positioned by a screw-in lid 55 in the ball valve housing 25 via the upper end member 53 and the support pipes 48, 49.

In the drawings, the ball valve 29 is shown in a switching position which corresponds to the filtration operation using the main filter 3. In this case, as shown, the switching ball 33 blocks the input opening 47 of the spacer member 41 and therefore the fluid entry to the auxiliary filter 43, so that it is disabled. On the other hand, the switching ball 33, as can be seen most clearly from FIG. 3, establishes the fluid connection between the input chamber 23, and therefore the fluid input 19, and an entry opening 57, which leads via the fluid guide 7 to the unfiltered side 8 of the main filter 3 for filtration operation. The filtrate reaches the output channel 11 via the fluid guide 9 and the check valve 15 and leaves the device via the fluid output 13.

On the other hand, when the ball valve 29 is switched over, in that the switching ball 33 is rotated by the hand lever 59. The hand lever 59 is pivoted clockwise in the viewing direction corresponding to FIG. 3. The switching ball 33 then closes the entry opening 57 and releases the fluid path from the input chamber 23 to the input opening 47 of the auxiliary filter 43. While the main filter 3 is therefore disabled and can be replaced, the operation of the affected facility is possible via the auxiliary filter 43 without interruption. For the operational monitoring during normal filtration operation, a contamination display 61 is provided, which is only visible in FIG. 1, which monitors the differential pressure between input channel 17 and output channel 11.

While one embodiment has been chosen to illustrate the invention, it will be understood by those skilled in the art that various changes and modifications can be made therein without departing from the scope of the invention as defined in the claims.

The invention claimed is:

1. A device, comprising a filter housing having an unfiltrate fluid input and a filtrate fluid output; a first filter element integrated into an interior of said filter housing as an auxiliary filter; a second filter element coupled to said filter housing; a switching device located in said filter housing connecting said unfiltrate fluid input in fluid communication to said filtrate fluid output via said auxiliary filter in a first position of said switching device and connecting said unfiltrate fluid input in fluid communication to said filtrate fluid output via said second filter element in a second position of said switching device, said switching device having a ball valve; and a spacer member being a separate member positioned in said filter housing and holding a switching ball of said ball valve in a ball valve housing of said ball valve, said spacer member being a shared functional element of and being located between and connecting said auxiliary filter and said ball valve housing, said spacer member having an inlet opening forming a fluid path between said ball valve and an inner filter cavity of said auxiliary filter; and wherein said first and second filter elements have parallel longitudinal axes and are axially offset relative to one another and wherein said ball valve is coaxially aligned with said longitudinal axis of said auxiliary filter.

2. A device, comprising a filter housing having an unfiltrate fluid input and a filtrate fluid output; a first filter element integrated into an interior of said filter housing as an auxiliary filter; a second filter element coupled to said filter housing; a switching device located in said filter housing connecting said unfiltrate fluid input in fluid communication to said filtrate fluid output via said auxiliary filter in a first position of said switching device and connecting said unfiltrate fluid input in fluid communication to said filtrate fluid output via said second filter element in a second position of said switching device, said switching device having a ball valve; and a spacer member being a separate member positioned in said filter housing and holding a switching ball of said ball valve in a ball valve housing of said ball valve, said spacer member being a shared functional element of and being located between and connecting said auxiliary filter and said ball valve housing, said spacer member having an inlet opening forming a fluid path between said ball valve and an inner filter cavity of said auxiliary filter; and wherein said second filter element is removably attached to an exterior of said filter housing as a main filter.

3. A device according to claim 1 wherein
said auxiliary filter and said ball valve are unified as an assembly in said filter housing.

4. A device according to claim 1 wherein
said spacer member presses and engages directly against said auxiliary filter and said ball valve.

5. A device according to claim 1 wherein
said ball valve housing extends beyond said switching ball along a main longitudinal axis extending through said inner filter cavity of said auxiliary filter; and
an output channel extends in said filter housing perpendicularly relative to said main longitudinal axis and extends between said filtrate fluid output and said ball valve housing.

6. A device according to claim 5 wherein
said auxiliary filter is at a connection of said output channel and said ball valve housing and includes a filter medium separating said inner filter cavity of said auxiliary filter from said output channel.

7. A device according to claim 5 wherein
said ball valve housing comprises an entry opening on a side of said ball valve housing opposite said inlet opening and comprises an inflow opening aligned on a spindle axis of said switching ball, said entry opening enclosing said main longitudinal axis and being connected in fluid communication to an unfiltered side of said second filter element, said inflow opening being connected in fluid communication with said unfiltrate fluid input, said inflow opening being selectively connected in fluid communication to said entry opening leading to said second filter element or to said inlet opening leading to said auxiliary filter.

8. A device according to claim 1 wherein
said spacer member engages a sealing disk of said ball valve housing on one side of said sealing disk, an opposite side of said sealing disk engaging said ball valve housing.

9. A device according to claim 1 wherein
said spacer member forms an element receptacle for said auxiliary filter.

10. A device according to claim 1 wherein
said ball valve housing extends beyond said switching ball along a main longitudinal axis extending through said inner filter cavity of said auxiliary filter; and
said inlet opening of said spacer member is concentric to said main longitudinal axis.

11. A device according to claim 1 wherein
said auxiliary filter directly engages said spacer member.

12. A device according to claim 1 wherein
said ball valve is coaxially aligned with a longitudinal axis of said auxiliary filter.

13. A device for fluids, comprising
a filter housing having an unfiltrate fluid input and a filtrate fluid output;
a first filter element integrated into an interior of said filter housing as an auxiliary filter with a first longitudinal axis;
a second filter element being coupled to said filter housing and having a second longitudinal axis;
a switching device located in said filter housing connecting said unfiltrate fluid input in fluid communication to said filtrate fluid output via said auxiliary filter in a first position of said switching device and connecting said unfiltrate fluid input in fluid communication to said filtrate fluid output via said second filter element in a second position of said switching device, said switching device having a ball valve;
a spacer member being a separate member positioned in said filter housing and holding a switching ball of said ball valve in a ball valve housing of said ball valve, said spacer member being a shared functional element of and being between said auxiliary filter and said ball valve housing, said spacer member having an inlet opening forming a fluid path between said ball valve and an inner filter cavity of said auxiliary filter, said spacer member, said ball valve and said auxiliary filter being coaxially mounted in a single axially extending passageway being in said filter housing and having a radial dimension sufficient to receive said ball valve, said spacer and said auxiliary filter axially within said passageway from an open end of said passageway; and
a removable lid closing said open end of said passageway.

14. A device according to claim 13 wherein
said second filter element is removably attached to an exterior of said filter housing as a main filter.

15. A device according to claim 13 wherein
said auxiliary filter, said ball valve and said spacer are unified as an assembly in said filter housing.

16. A device according to claim 13 wherein
said spacer member presses and engages directly against said auxiliary filter and said ball valve.

17. A device according to claim 13 wherein
said ball valve housing extends beyond said switching ball along a main longitudinal axis extending through said inner filter cavity of said auxiliary filter; and
an output channel extends in said filter housing perpendicularly relative to said main longitudinal axis and extends between said filtrate fluid output and said ball valve housing.

18. A device according to claim 17 wherein
said auxiliary filter is at a connection of said output channel and said ball valve housing and includes a filter medium separating said inner filter cavity of said auxiliary filter from said output channel.

19. A device according to claim 17 wherein
said ball valve housing comprises an entry opening on a side of said ball valve housing opposite said inlet opening and comprises an inflow opening aligned on a spindle axis of said switching ball, said entry opening enclosing said main longitudinal axis and being connected in fluid communication to an unfiltered side of said second filter element, said inflow opening being connected in fluid communication with said unfiltrate fluid input, said inflow opening being selectively connected in fluid communication to said entry opening leading to said second filter element or to said inlet opening leading to said auxiliary filter.

20. A device according to claim 13 wherein
said spacer member is located between and connects said auxiliary filter and said ball valve housing.

* * * * *